United States Patent [19]

Carman et al.

[11] Patent Number: 4,457,735
[45] Date of Patent: * Jul. 3, 1984

[54] GEAR TYPE COUPLING WITH OVERLOAD PROTECTION

[75] Inventors: Kenneth K. Carman, Ellicott City; Stanley G. Webb, Severna Park, both of Md.

[73] Assignee: Koppers Company, Inc., Pittsburgh, Pa.

[*] Notice: The portion of the term of this patent subsequent to Sep. 7, 1999 has been disclaimed.

[21] Appl. No.: 223,613

[22] Filed: Jan. 9, 1981

Related U.S. Application Data

[63] Continuation-in-part of Ser. No. 952,628, Oct. 19, 1978, abandoned.

[51] Int. Cl.³ .................... F16D 3/18; F16D 9/00
[52] U.S. Cl. .................... 464/32; 464/158
[58] Field of Search .................. 285/2; 403/2, DIG. 3; 464/32, 154, 156, 158, 159

[56] References Cited

U.S. PATENT DOCUMENTS

| | | | |
|---|---|---|---|
| 3,071,945 | 1/1963 | Shomo | 64/28 R |
| 3,132,494 | 5/1964 | Hoffer | 64/9 R |
| 3,475,043 | 10/1969 | Anderson | 64/9 R |
| 3,673,814 | 7/1972 | Carman | 64/9 R X |
| 3,889,489 | 6/1975 | Casey et al. | 64/9 R |
| 3,999,404 | 12/1976 | Banki et al. | 64/9 R X |
| 4,347,715 | 9/1982 | Carman et al. | 464/32 |

Primary Examiner—John M. Jillions
Assistant Examiner—Daniel P. Stodola
Attorney, Agent, or Firm—Thomas L. Sivak; Herbert J. Zeh, Jr.

[57] ABSTRACT

An improved gear type coupling wherein the sleeve thereof is a torsional shear element to provide torsional overload protection to the coupling and its connected equipment. The shear section of the shear element is an integral part thereof and all sections of the shear element conduct an equal share of the transmitted torque.

4 Claims, 4 Drawing Figures

GEAR TYPE COUPLING WITH OVERLOAD PROTECTION

This is a continuation of application Ser. No. 952,628, filed Oct. 19, 1978, now abandoned.

BACKGROUND OF THE INVENTION

1. Field of the Invention

This invention relates to gear type couplings and, more particularly, to spindle couplings of the type used in connecting a powered prime mover to the rolls of a rolling mill as well as to like apparatus.

2. Description of the Prior Art

Generally, gear coupling of the spindle type such as those used in rolling mills include a coupling sleeve at each end of a spindle shaft. The sleeve at the driving end of the spindle shaft connects drivingly to a powered prime mover or a pinion stand and at the driver end of the shaft the sleeve connects to the spade end of a roll in the rolling mill. During operation excessive torsional stresses can be encountered that will lead to expensive and extensive damage to either the driving machinery or the rolling mill. These excessive torsional stresses can also lead to a catastrophic failure of the coupling itself, causing additional damage to both the driving machinery and the rolling mill as well as requiring a complete replacement of the coupling. U.S. Pat. No. 3,999,404 discloses one type spindle coupling which provides torque overload protection. While the disclosure of U.S. Pat. No. 3,999,404 does provide torque overload protection, the design requires that the shear element be mounted on the shaft and that mating and coacting surface of the shaft and shear sleeve be specially shaped to provide freedom of movement for the sections of the shear sleeve in the event of a torque overload.

Accordingly, the objects of the present invention include a more easily accessible shear element in that the hub of the shaft need not be disturbed in the event of a torque overload and a shear element that does not require special mating faces between the shaft and shear element.

SUMMARY OF THE INVENTION

These and other objects of the present invention are achieved by providing a spindle coupling in which the sleeve is the torsional shear element. The shear section of the shear element is fixed to the sleeve for rotation therewith. The shear section is of reduced cross-sectional area and radial and axial clearances are provided to provide for a non-uniform break.

DESCRIPTION OF THE PREFERRED EMBODIMENT

Figure 1:
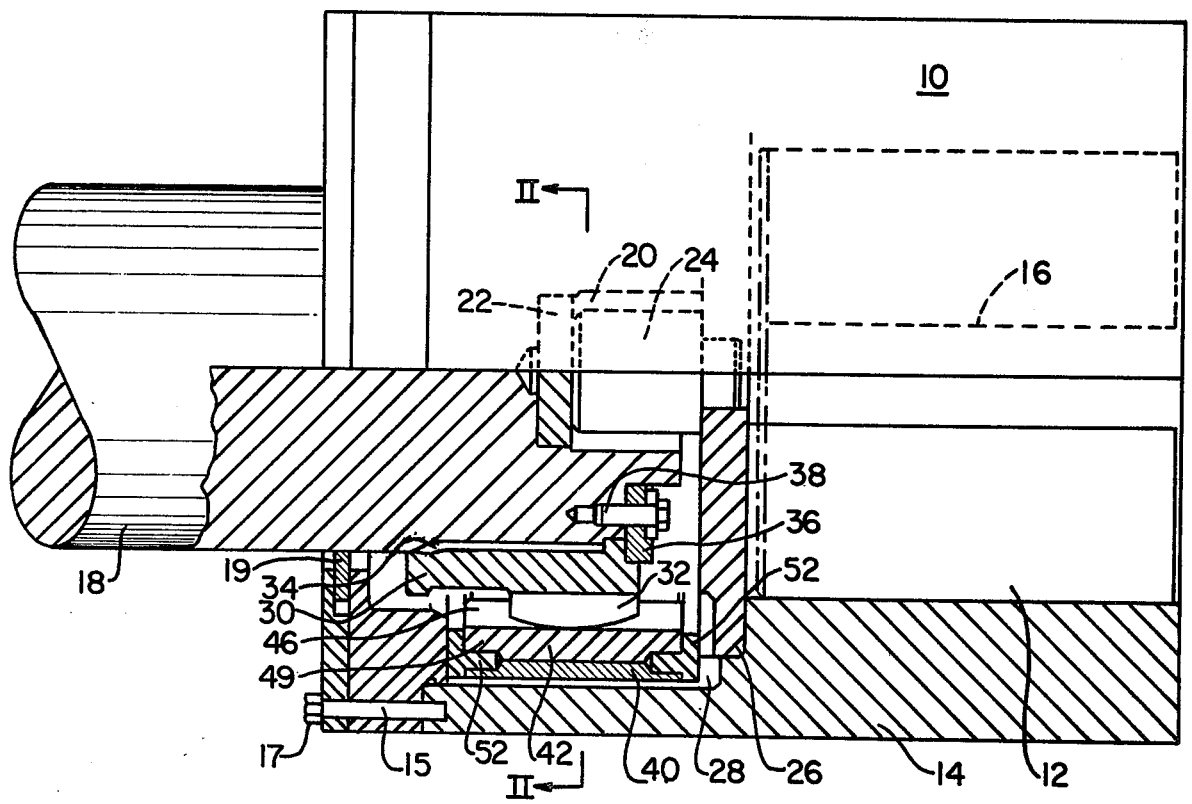
FIG. 1 is an elevational view, partly in section, of the driving end of a spindle coupling including the shear element of the present invention.
Figure 2:
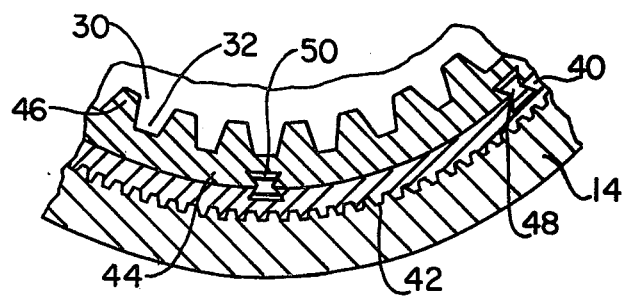
FIG. 2 is an elevational view, partly in section, taken along line II—II of FIG. 1.

Referring to FIG. 1, the driving end of a spindle coupling 10 has a driving shaft 12 to which a sleve 14 is fixed for rotation therewith through keyway 16. Shaft 18 has a cavity 20 which is adapted to receive shaft thrust button 22 and thrust button 24. Shaft button 22 coacts with thrust button 24 which engages and coacts with thrust plate 26 secured in the conventional manner in cavity 28 of the driving end sleeve 14. Abutting the end of sleeve 14 is end ring 15 which is fixed to sleeve 14 by bolts 17. End ring plate is bolted to ring 15 and a seal ring 19. Surrounding the end of shaft 18 is flex hub 30 which includes a plurality of gear teeth 32. Hub 30 is splined to shaft 18 at 34 and is retained in position by means of a hub ring 36 and bolt fasteners 38.

Sleeve 14 includes an external intermediate sleeve 40 which is fixed for rotation therewith through spline 42. Internal intermediate sleeve 44 includes a plurality of conventional straight intermediate gear teeth 46 which mesh and coact with gear teeth 32. A plurality of shear key connections 48 are keyed 50 between internal and external intermediate sleeves 40 and 44. In operation, torque is transmitted from driving shaft 12 through sleeve 14 to intermediate sleeve 40 through shear keys 48 to intermediate sleeve 44 and teeth 46 to hub 30 to shaft 18. If the torque exceeds a predetermined amount, shear keys 48 will shear and the torque transmission from driving shaft 12 to coupling shaft 18 will be interrupted, thus preventing any overload damage to the driving or driven machinery. Radial and axial clearance is provided for shear pin connections 48 in keyway 50 to compensate for uneven breaks in keys 48. Support bearings 52 are provided to maintain relative rotation sleeves 40 and 44. Bearing 52 also minimizes bending moments of pins 48 during normal operation.

Figure 3:
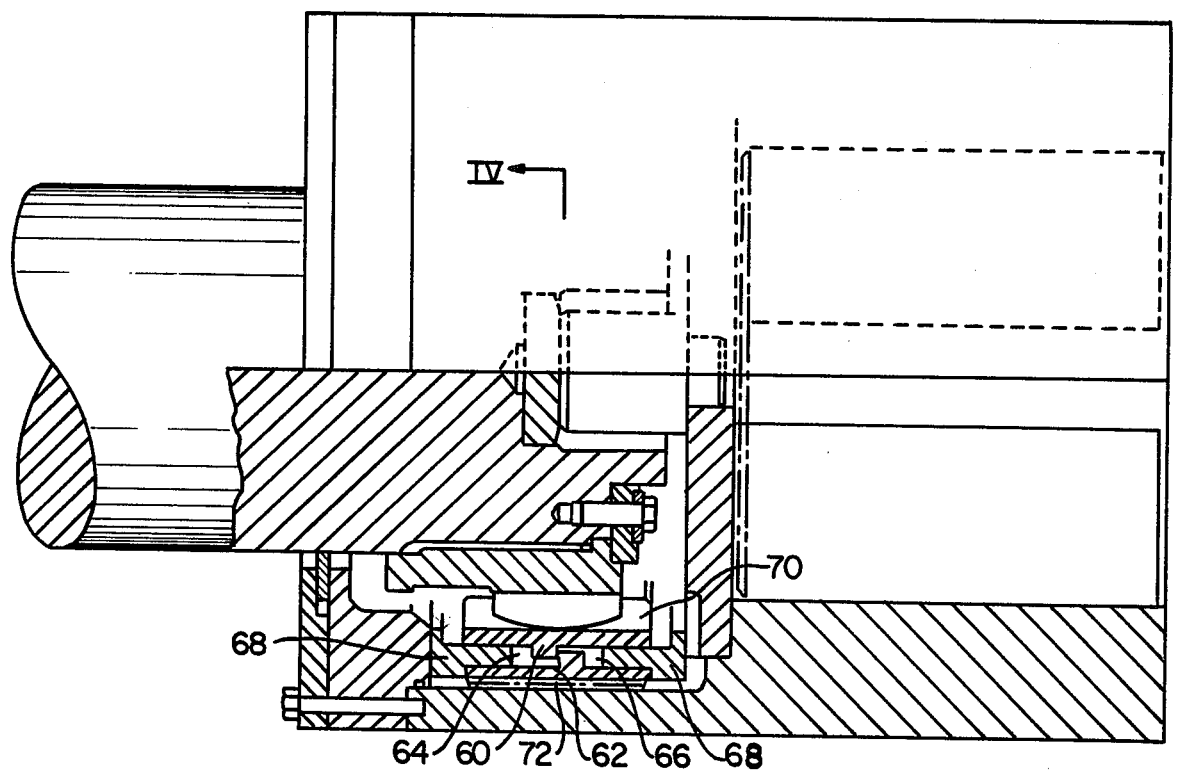
FIG. 3 is an elevational view, partly in section, of the driving end of a spindle coupling including an alternate embodiment of the shear element of the present invention.
Figure 4:
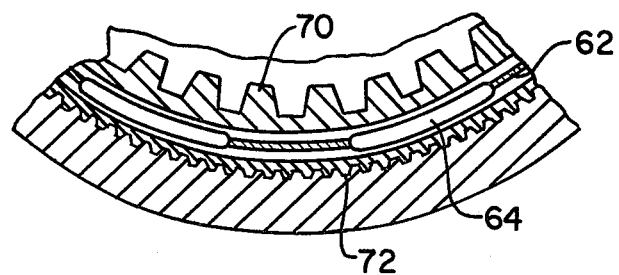
FIG. 4 is an elevational view, partly in section, taken along line III—III of FIG. 3.

FIG. 3 illustrates another embodiment of the present invention and elements therein that are the same as those in FIG. 1 bear like numerals. The sleeve 14 of shaft 12 in FIG. 3 includes an intermediate sleeve 60 which has a shaped shear connection 62. Shaped shear zone 62 includes cavities 64 and 66 which accommodate support bearings 68. Support bearings 68 minimize the bending moment within the shaped shear connection. Surface 70 of intermediate sleeve 60 is formed into a plurality of conventional straight intermediate gear teeth which mesh and coact with gear teeth 32 of hub 30. Intermediate sleeve 60 is splined to sleeve 14 at 72. In operation, torque is transmitted from driving shaft 12 through sleeve 14 to intermediate sleeve 60 to teeth 70 to hub 30 to shaft 18. If the torque exceeds the predetermined amount, shaped shear zone 62 will shear and the torque transmission will be interrupted, thus preventing overload damage. Bearings 68 maintain the relative rotational movement between the broken section of sleeve 60 and cavaties 64 and 66 accommodate compensate for uneven breaks in zone 62.

In another embodiment of the invention, not shown, it is understood that intermediate sleeve 40 could be fixed to the hub 30 and sleeve 44 would have gear teeth which cooperate with internal gear teeth formed in sleeve 14 in a conventional manner, or intermediate sleeve 60 could be fixed to hub 30 and likewise have gear teeth which cooperate with internal gear teeth formed on hub 30 in a conventional manner.

While we have described certain preferred embodiments of our invention, it will be understood that it may be otherwise embodied within the scope of the following claims.

What is claimed:

1. In a gear type coupling comprising a floating shaft, hub means fixed to said floating shaft at each end thereof, said hub means having a plurality of outwardly extending gear teeth formed thereon, and sleeve means having an inner axial bore operably connected to a driving shaft and a driven shaft, said inner axial bore of said sleeve means having a plurality of inwardly extending gear teeth, said hub means and sleeve means rotatable by means of said gear teeth, the improvement comprising:

intermediate sleeve means comprised of a driven member and a driving member fixed to the outwardly extending gear teeth of the hub means, said intermediate sleeve means having outwardly extending gear teeth which mesh and coact with said inwardly extending gear teeth of said axial bore of said sleeve means, said intermediate sleeve means having a contoured shear connection of reduced cross-sectional area operably connecting and providing radial clearance between the surfaces of the driven and driving members of the intermediate sleeve means and said shear connection being substantially axially aligned with said gear teeth formed on said hub means and said sleeve means.

2. The gear coupling of claim 1 wherein said intermediate sleeve means includes bearing means adapted to engage the surface of the driven and driving members of said intermediate sleeve means.

3. In a gear type coupling comprising a floating shaft, hub means fixed to said floating shaft at each end thereof, said hub means having a plurality of outwardly extending gear teeth formed thereon, and sleeve means having an inner axial bore operably connected to a driven shaft and driving shaft, said inner axial bore of said sleeve means having a plurality of inwardly extending gear teeth, said hub means and sleeve means rotatable by means of said gear teeth, the improvement comprising: intermediate sleeve means comprised of a driven member and driving member fixed to said inwardly extending gear teeth of said axial bore of said sleeve means said intermediate sleeve means having inwardly extending gear teeth which mesh and coact with said outwardly extending gear teeth formed on said hub means, said intermediate sleeve means having a contoured shear connection of reduced cross-sectional area operably connecting and providing radial clearance between the surfaces of the driven and driving members of the intermediate sleeve means and said shear connection being substantially axially aligned with said gear teeth formed on said hub means and said sleeve means.

4. The gear coupling of claim 3 wherein said intermediate sleeve means includes bearing means adapted to engage the surface of the driven and driving members of said intermediate sleeve means.

* * * * *